United States Patent [19]

Chen et al.

[11] Patent Number: 5,711,463
[45] Date of Patent: Jan. 27, 1998

[54] DISTRIBUTOR FOR DISTRIBUTING A SMALL AMOUNT OF PARTICLES

[76] Inventors: Han-kuei Chen; Han-wey Chen, both of No. 863, Chienhsing Rd., North Dist., Taichung, Taiwan

[21] Appl. No.: 725,827

[22] Filed: Oct. 7, 1996

[51] Int. Cl.⁶ .................................................... G01F 11/26
[52] U.S. Cl. ............................................................ 222/456
[58] Field of Search .................................. 222/455, 456, 222/426, 154, 568

[56] References Cited

U.S. PATENT DOCUMENTS

| | | | |
|---|---|---|---|
| 3,687,341 | 8/1972 | Stanley et al. | 222/455 |
| 4,015,758 | 4/1977 | Cavazza | 222/455 |
| 5,064,106 | 11/1991 | Butler et al. | 222/456 |

FOREIGN PATENT DOCUMENTS 2557694  6/1977  Germany ................................ 222/456

*Primary Examiner*—Philippe Derakshani
*Attorney, Agent, or Firm*—Watson Cole Stevens Davis, P.L.L.C.

[57] ABSTRACT

A distributor includes a cap mounted on a container and the cap has a first tubular member extending therefrom, the cap having a first hole defined therein which is enclosed by the first tubular member, a mounting member having a top board from which a second tubular member extends downwardly therefrom in which the first tubular member extends with a first space defined between the top board and a distal periphery of the first tubular member, a gap defined between the second tubular member and the cap, a c-shaped skirt extending downwardly from the top board with two end sides connected to an inner periphery of the mounting member and the second tubular member tangentially connected to an inner periphery of the c-shaped skirt such that a second space is defined between the c-shaped skirt, the second tubular member and the inner periphery of the mounting member, the top board having an outlet defined therein and communicating with the second space.

5 Claims, 5 Drawing Sheets

DISTRIBUTOR FOR DISTRIBUTING A SMALL AMOUNT OF PARTICLES

BACKGROUND OF THE INVENTION

1. Field of the Invention

The present invention relates to a distributor and more particularly, to a distributor mounted on a container for distributing a small amount of particles in each operation of the distributor from the container.

2. Brief Description of the Prior Art

Generally, when a person wants to access a small quantity of particles received in a container, he/she often opens the container and slightly tilts the container to an inclined position to pour a small quantity of particles on his/hand or a surface. However, the quantity of the particles poured from the container is usually more than is needed because the particles roll easily and an opening of the container is much larger than a single particle. Accordingly, skillis needed when operating the container to control the quantity of the particles poured from the container. Obviously, a child cannot operate the container very well and an excess of particles, such as sugars, powder or pet food, could drop on a carpet and will be hard to clean up.

The present invention provides a distributor which has a cap mounted on a container and a mounting member, the container is turned up-side-down to have a small amount of particles there in enter into the mounting member and the amount is controlled by separated plates in the mounting member such that the problems mentioned above can be mitigated and/or obviated.

SUMMARY OF THE INVENTION

The present invention provides a distributor which includes a cap having a first hole defined centrally therein and a first tubular member extending from the cap with a first hole enclosed by the first tubular member. The cap is mounted to a container and the first hole communicates with an interior of the container.

A mounting member is a tubular member and has a top board disposed to one end thereof and the cap is connected to the other end of the mounting member. A second tubular member extends eccentrically and downwardly from an under side of the top board for the first tubular member inserted therein with a first space defined between the top board and a distal periphery of the first tubular member. A gap is defined between a distal periphery of the second tubular member and an upper side of the cap.

A c-shaped skirt extends downwardly from the under side of the top board and both end sides of the c-shaped skirt are connected to an inner periphery of the mounting member, a distal periphery of the c-shaped skirt contacting the upper side of the cap. The second tubular member is tangentially connected to an inner periphery of the c-shaped skirt. The top board has an outlet defined therein which communicates with a second space enclosed by the second tubular member, the c-shaped skirt and the inner periphery of the mounting member.

It is an object of the present invention to provide a distributor which distributes a small amount of particles from a container on which the distributor is mounted.

It is another object of the present invention to provide a distributor which is operated by turning up-side-down the container together with the distributor first and then returning both to their original position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
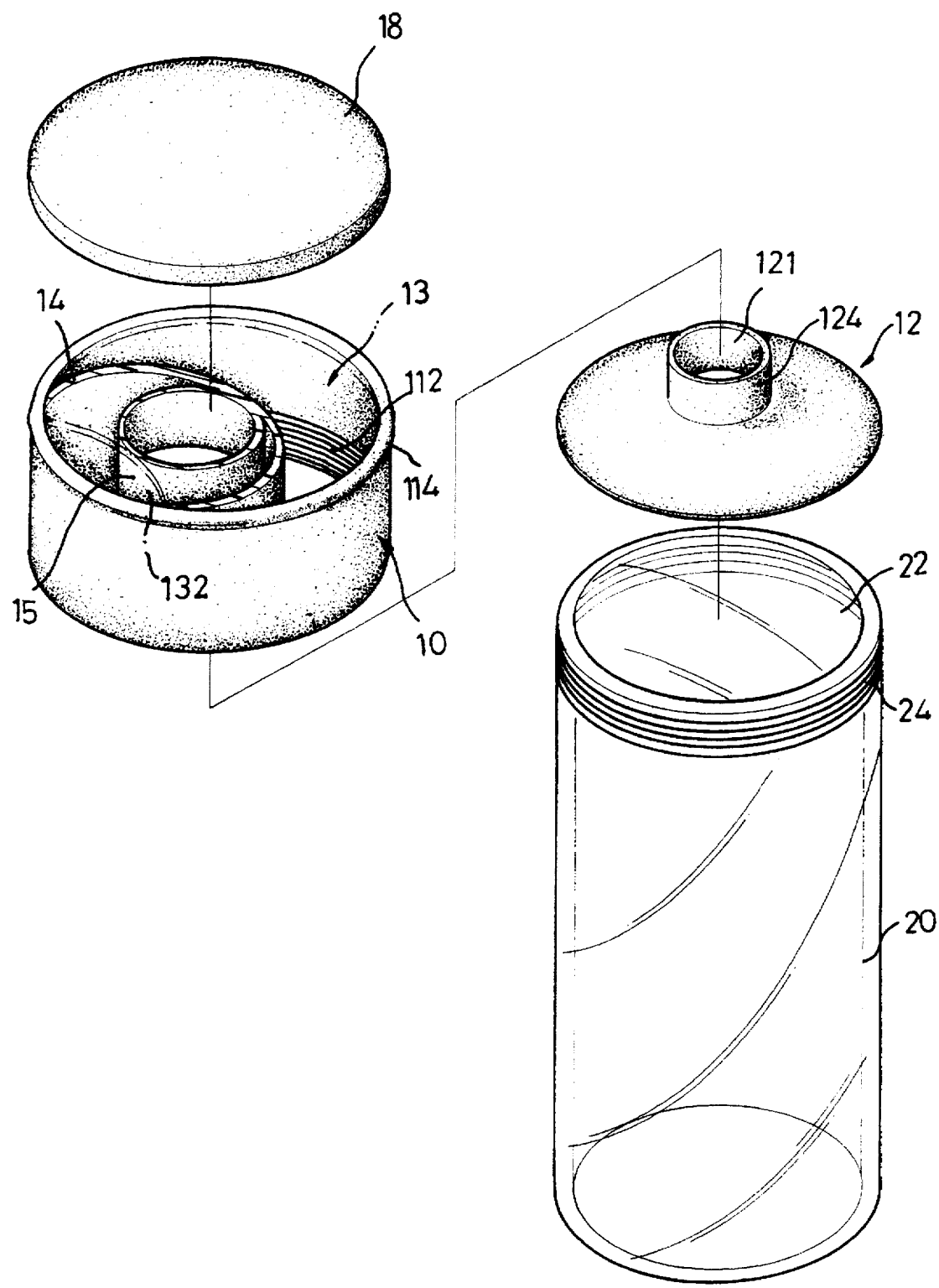
FIG. 1 is an exploded view of a distributor and a container in accordance with the present invention.
Figure 2:
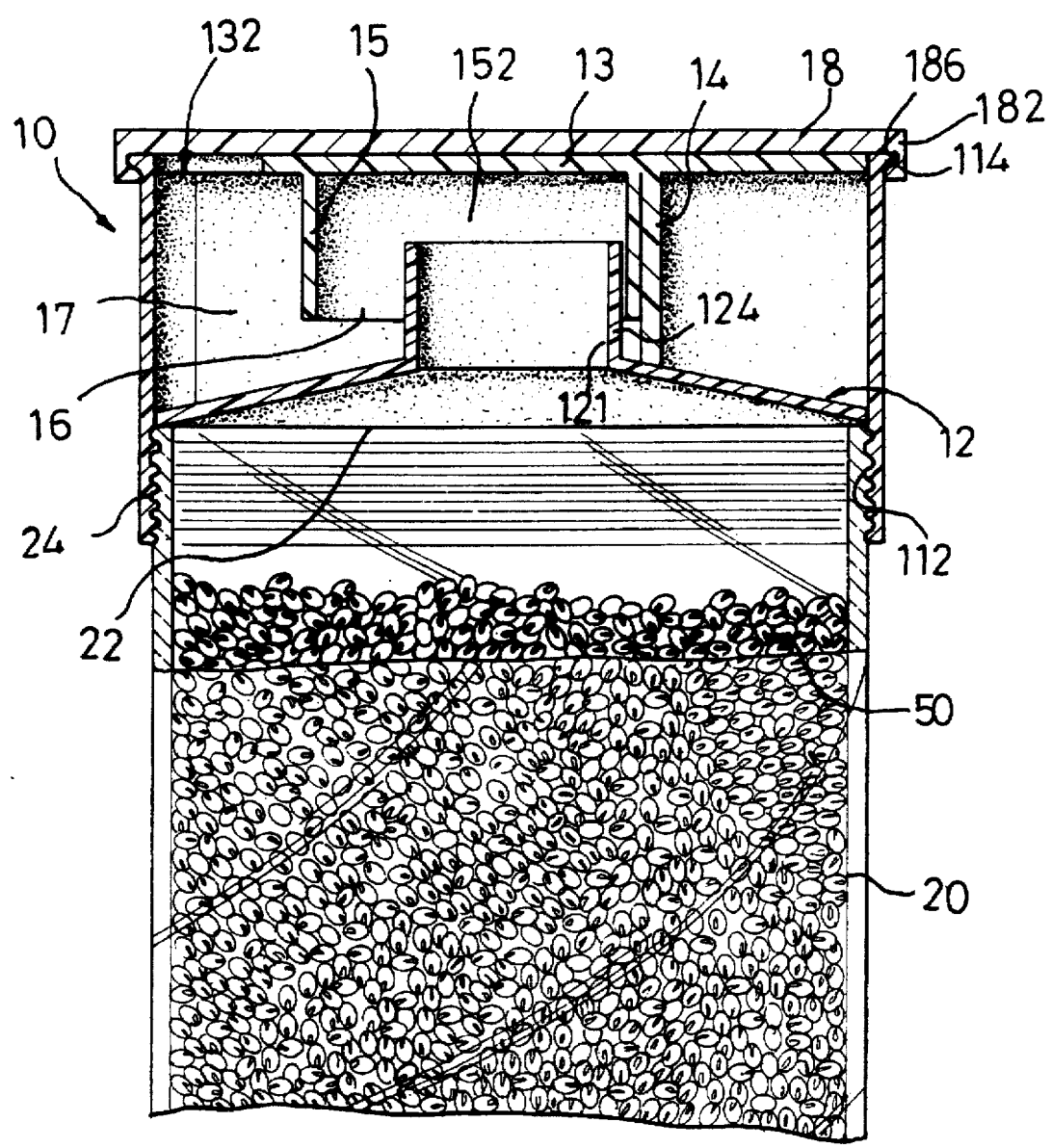
FIG. 2 is a side elevational view, partly in section, of the distributor mounted to the container in accordance with the present invention.

Referring to the drawings and initially to FIGS. 1 and 2, a container 20 for receiving small particles such as beans 50 has a bottom and an open end 22, and a first threaded portion 24 is defined in an outer periphery of the open end 22. A distributor in accordance with the present invention generally includes a cap 12 having a first hole 121 defined centrally therein and a first tubular member 124 extends from the cap 12. The first tubular member 124 encloses the first hole 121 and the cap 12 is mounted to the container 20 wherein the first hole 121 communicates with an interior of the container 20. An upper side of the cap 12 is a tapered surface.

A mounting member 10 is a tubular member and has a second threaded portion 112 defined in an inner and lower periphery thereof so as to engage with the first threaded portion 24 of the container 20. A top board 13 is disposed to one end thereof wherein the top board 13 is made of transparent material and a second tubular member 15 extends eccentrically and downwardly from an under side of the top board 13. The cap 12 is mounted to the other end of the mounting member 10 such that the first tubular member 124 is inserted into the second tubular member 15 with a first space 152 defined between the top board 13 and a distal periphery of the first tubular member 124. A gap 16 is defined between a distal periphery of the second tubular member 15 and the upper side of the cap 12. A c-shaped skirt 14 having two distal ends extends downwardly from the under side of the top board 13 and both of the ends of the c-shaped skirt 14 are integralty connected to the inner periphery of the mounting member 10 with a distal periphery of the c-shaped skirt 14 contacting the upper side of the cap 12. The second tubular member 15 is tangentially connected to an inner periphery of the c-shaped skirt 14. The top board 13 has an outlet 132 defined therein which communicates with a second space 17 enclosed by the second tubular member 15, the c-shaped skirt 14 and the inner periphery of the mounting member 10.

Figure 3:
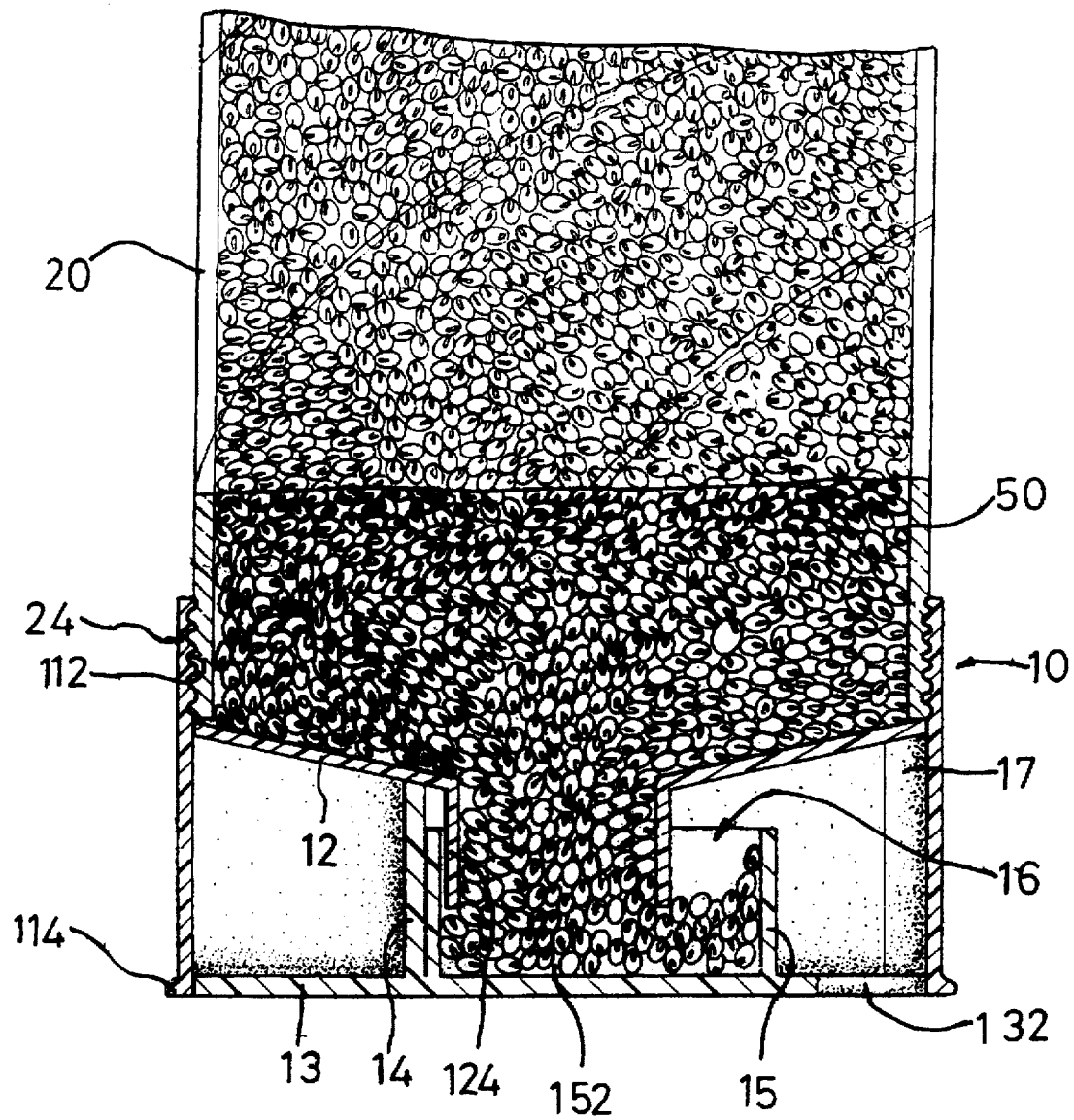
FIG. 3 is a side elevational view, partly in section, of the container and the distributor both are turned up-side-down.
Figure 4:
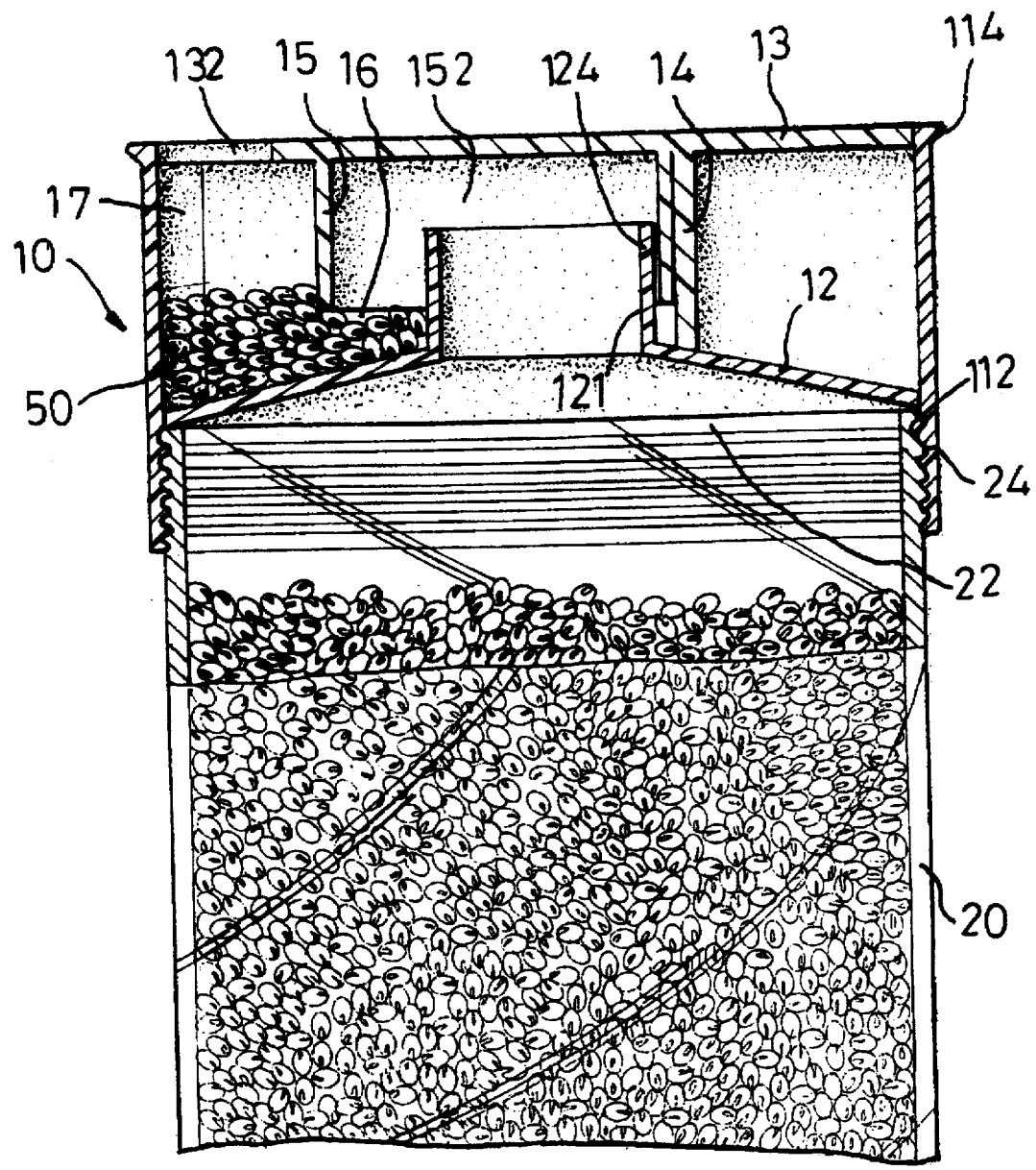
FIG. 4 is a side elevational view, partly in section, of the container and the distributor both are turned back to a normal (original) position.
Figure 5:
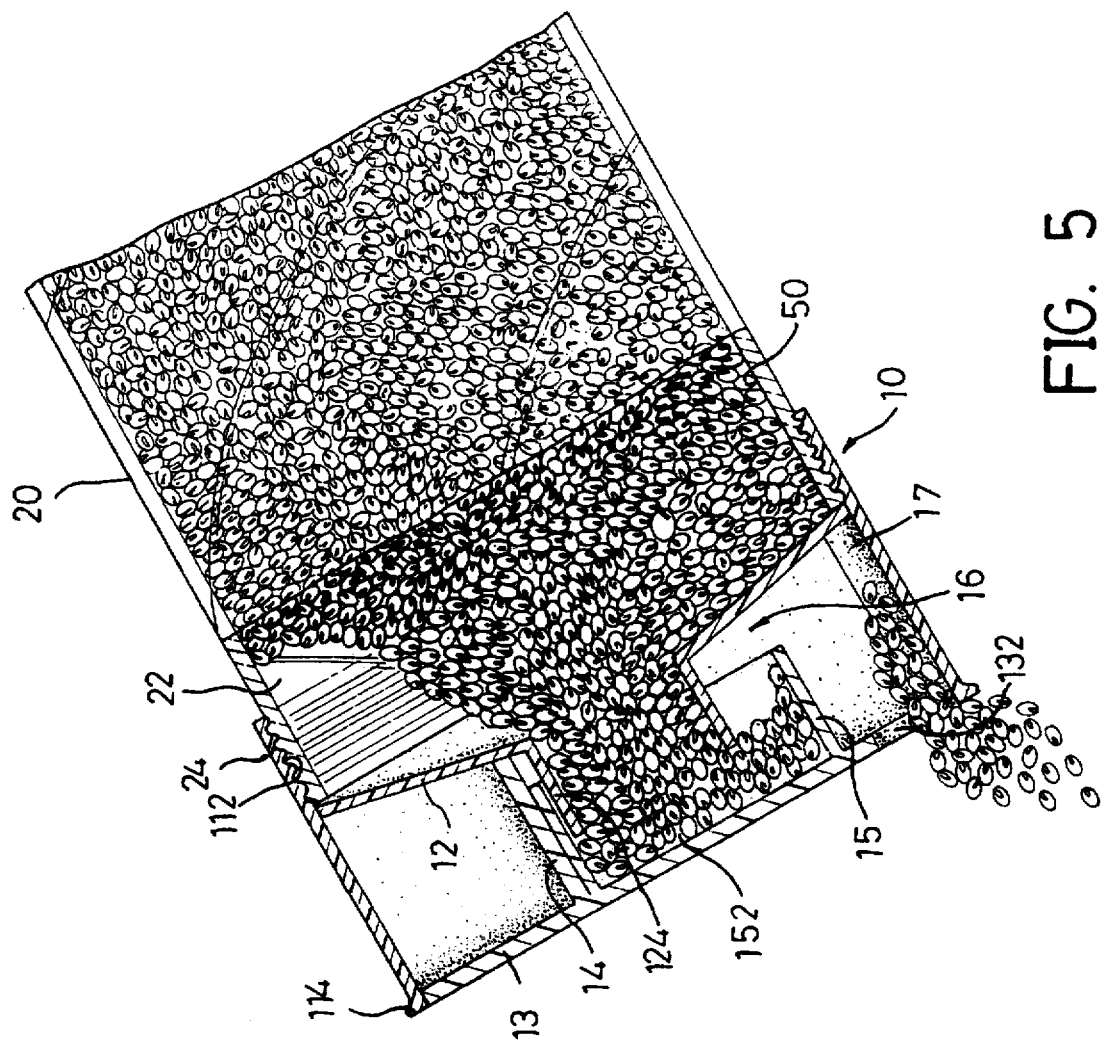
FIG. 5 is a side elevational view, partly in section, to show the amount of small particles is poured out from an outlet of the distributor.

Referring to FIGS. 3–5, when operating the distributor, a user (not shown) turns up-side-down the container 20 to which the distributor is mounted to let the beans 50 fill the first space 152 and then turns them both back to a normal (original) position as shown in FIG. 4 to let the beans 50 in the first space 152 within a range of the first tubular member 124 drop into the container 20. During the process, a small amount of beans 50 drop via the gap 16 to the second space 17. Accordingly, the small amount of beans 50 in the second space 17 can be poured out from the outlet 132 as shown in FIG. 5.

A cover 18 is selectably mounted to the mounting member 10, the cover 18 having a skirt portion 182 extending downwardly from a periphery thereof and the skirt portion 182 having an annular groove 186 defined in an inner periphery thereof. The mounting member 10 has a flange 114 extending radially from an upper periphery thereof so as to be received in the annular groove 186 when the cover 18 is mounted to the mounting member 10.

Accordingly, the distributor is easily to be operated and a small amount of beans 50 in the container 20 is quickly and conveniently collected by the container 20 turning up-side-down twice.

Although the invention has been explained in relation to its preferred embodiment, it is to be understood that many other possible modifications and variations can be made without departing from the spirit and scope of the invention as hereinafter claimed.

What is claimed is:

1. A distributor mounted to a container and comprising:

a cap having a first hole defined centrally therein and a first tubular member extending from said cap, said first tubular member enclosing said first hole, said cap mounted to said container and communicating with an interior of said container, and a mounting member being a tubular member and having a top board disposed to one end thereof, a second tubular member extending downwardly from an under side of said top board and said cap connected to the other end of said mounting member, said first tubular member extending into said second tubular member with a first space defined between said top board and a distal periphery of said first tubular member, a gap defined between a distal periphery of said second tubular member and an upper side of said cap, a c-shaped skirt having two clistal ends extending downwardly from said under side of said top board and both end sides of said c-shaped skirt integrally connected to an inner periphery of said mounting member, a distal periphery of said c-shaped skirt contacting said upper side of said cap, said second tubular member tangentially connected to an inner periphery of said c-shaped skirt, said top board having an outlet defined therein which communicates with a second space enclosed by said second tubular member, said c-shaped skirt and said inner periphery of said mounting member.

2. The distributor as claimed in claim 1 wherein a cover is mounted to said mounting member, said cover having a skirt portion extending downwardly from a periphery thereof and said skirt portion having an annular groove defined in an inner periphery thereof, said mounting member having a flange extending radially from an upper periphery thereof so as to be received in said annular groove.

3. The distributor as claimed in claim 1 wherein said top board is made of transparent material.

4. The distributor as claimed in claim 1 wherein said upper side of said cap is a tapered surface.

5. The distributor as claimed in claim 1 wherein said second tubular member extends eccentrically and downwardly from said under side of said top board.

\* \* \* \* \*